(12) United States Patent
Ishii

(10) Patent No.: US 12,293,509 B2
(45) Date of Patent: May 6, 2025

(54) IMAGE PROCESSING APPARATUS, IMAGE PROCESSING METHOD, AND STORAGE MEDIUM FOR DETERMINING PRESENCE OR ABSENCE OF PRINT ABNORMALITY

(71) Applicant: CANON KABUSHIKI KAISHA, Tokyo (JP)

(72) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 17/709,223

(22) Filed: Mar. 30, 2022

(65) Prior Publication Data
US 2022/0318977 A1 Oct. 6, 2022

(30) Foreign Application Priority Data
Apr. 5, 2021 (JP) .................................. 2021-063948

(51) Int. Cl.
G06T 7/00 (2017.01)
G06T 7/13 (2017.01)
(52) U.S. Cl.
CPC ............ *G06T 7/001* (2013.01); *G06T 7/0008* (2013.01); *G06T 7/13* (2017.01); *G06T 2207/20212* (2013.01); *G06T 2207/30144* (2013.01)
(58) Field of Classification Search
CPC .................. G06T 2207/30144; G06T 7/001
See application file for complete search history.

(56) References Cited

U.S. PATENT DOCUMENTS

| 6,658,139 B1 * | 12/2003 | Cookingham | ....... G06V 10/987 |
| | | | 382/141 |
| 11,343,383 B2 * | 5/2022 | Ichikawa | ........... H04N 1/00045 |
| 2003/0185446 A1 * | 10/2003 | Huang | .................... G06T 7/001 |
| | | | 382/218 |
| 2003/0185447 A1 * | 10/2003 | Huang | .................... G06T 15/00 |
| | | | 382/218 |

(Continued)

FOREIGN PATENT DOCUMENTS

| EP | 0332706 A1 * | 9/1989 |
| JP | 2015179073 A | 10/2015 |

(Continued)

OTHER PUBLICATIONS

B. Luo and G. Guo, "Fast printing defects inspection based on multi-matching," 2016 12th International Conference on Natural Computation, Fuzzy Systems and Knowledge Discovery (ICNC-FSKD), Changsha, China, 2016, pp. 1492-1496, doi: 10.1109/FSKD.2016.7603397 (Year: 2016).*

*Primary Examiner* — Michael Robert Cammarata
(74) *Attorney, Agent, or Firm* — Canon U.S.A., Inc. IP Division

(57) ABSTRACT

An image processing apparatus is configured to determine presence or absence of print abnormality in a target image by comparing a reference image or reference images, each of which is a print result to be a reference, and the target image, which is a print result to be an inspection target. The image processing apparatus includes a setting unit configured to set an inspection condition for a printed product, and a comparison unit configured to compare the reference image or reference images and the target image using a number of the reference images set based on the inspection condition.

8 Claims, 13 Drawing Sheets

(56) References Cited

U.S. PATENT DOCUMENTS

| | | | |
|---|---|---|---|
| 2009/0097729 A1* | 4/2009 | Venkatachalam | G06T 7/001 382/132 |
| 2012/0207210 A1* | 8/2012 | Laroche | H04N 19/61 375/240.03 |
| 2013/0038723 A1* | 2/2013 | Tsutsumi | H04N 23/673 382/106 |
| 2015/0243010 A1* | 8/2015 | Kaneko | G06T 7/001 382/112 |
| 2018/0038805 A1* | 2/2018 | Heikkilä | G01S 17/06 |
| 2018/0089523 A1* | 3/2018 | Itakura | G06T 7/11 |
| 2020/0151863 A1* | 5/2020 | Onishi | G01N 21/8851 |
| 2020/0265574 A1* | 8/2020 | Brauer | H01L 21/67288 |
| 2021/0090229 A1* | 3/2021 | Brauer | G06F 18/22 |
| 2021/0142459 A1* | 5/2021 | Ito | H04N 1/00034 |
| 2021/0304385 A1* | 9/2021 | Nakada | G06T 7/136 |
| 2022/0351359 A1* | 11/2022 | Zhang | G03F 7/705 |

FOREIGN PATENT DOCUMENTS

| | | | |
|---|---|---|---|
| JP | 2021037736 A | 3/2021 | |
| WO | WO-2010038883 A1 * | 4/2010 | G06T 7/001 |

* cited by examiner

FIG.6

INSPECTION SETTINGS

INSPECTION SENSITIVITY

- ● HIGH SENSITIVITY
- ○ LOW SENSITIVITY

FIG.12A

INSPECTION PRESET SELECTION

INSPECTION PRESET
- ⦿ PRESET A
- ○ PRESET B
- ○ PRESET C

FIG.12B

|  | PRESET A | PRESET B | PRESET C |
|---|---|---|---|
| INSPECTION SENSITIVITY | HIGH SENSITIVITY | MIDDLE SENSITIVITY | LOW SENSITIVITY |
| NUMBER OF REFERENCE CANDIDATE IMAGES TO BE SYNTHESIZED | $N_A$ | $N_B$ | $N_C$ |

FIG.13

| | PRESET A | PRESET B | PRESET C |
|---|---|---|---|
| PRINT QUALITY | HIGH QUALITY | HIGH QUALITY | HIGH SPEED |
| PRINT TARGET | PHOTOGRAPH | ILLUSTRATION | ILLUSTRATION |
| INSPECTION SENSITIVITY | HIGH SENSITIVITY | LOW SENSITIVITY | LOW SENSITIVITY |
| NUMBER OF REFERENCE CANDIDATE IMAGES TO BE SYNTHESIZED | Na | Nb | Nc |

IMAGE PROCESSING APPARATUS, IMAGE PROCESSING METHOD, AND STORAGE MEDIUM FOR DETERMINING PRESENCE OR ABSENCE OF PRINT ABNORMALITY

BACKGROUND

Field of the Disclosure

The present disclosure relates to an image processing technique for inspecting a printed product.

Description of the Related Art

A visual inspection by an inspector to inspect presence or absence of abnormality on printed products, such as stains and color drop-out, takes a lot of time and cost. Thus, in these days, an inspection system for automatically inspecting the printed products without being dependent on the visual inspection by an inspector is demanded. Examples of such an inspection system include a method of determining presence or absence of abnormality on printed products based on a difference value between scan data of a printed product as an inspection target and image data obtained by scanning a printed product without abnormality as a reference. Japanese Patent Application Laid-Open No. 2015-179073 discusses a method of preparing a plurality of reference images to improve inspection accuracy. More specifically, Japanese Patent Application Laid-Open No. 2015-179073 discusses a method of calculating a difference between an inspection target image and each of the plurality of reference images and determining presence or absence of abnormality based on a combination having a smallest difference.

However, according to the technique discussed in Japanese Patent Application Laid-Open No. 2015-179073, since a signal-to-noise (S/N) ratio of the reference image cannot be adjusted, excessive detection or erroneous detection may sometimes occur in inspection.

SUMMARY

According to embodiments of the present disclosure, an image processing apparatus is configured to determine presence or absence of print abnormality in a target image by comparing a reference image or reference images, each of which is a print result to be a reference, and the target image, which is a print result to be an inspection target. The image processing apparatus includes a setting unit configured to set an inspection condition for a printed product, and a comparison unit configured to compare the reference image or reference images and the target image using a number of the reference images set based on the inspection condition.

Further features of the present disclosure will become apparent from the following description of exemplary embodiments with reference to the attached drawings.

BRIEF DESCRIPTION OF THE DRAWINGS

FIG. 6 is a diagram illustrating an example of an inspection setting screen.

FIGS. 12A and 12B are diagrams illustrating an example of an inspection preset screen and an example of inspection preset contents, respectively.

FIG. 13 is a table illustrating an example of inspection preset contents.

DESCRIPTION OF THE EMBODIMENTS

Exemplary embodiments of the present disclosure will be described with reference to the attached drawings. The following exemplary embodiments are not intended to limit the present disclosure, and all of combinations of features described in the exemplary embodiments are not necessarily essential for the solutions of the present disclosure. The same components are described with the same numerals assigned, and the duplicate descriptions thereof are omitted.

An image processing apparatus 100 according to a first exemplary embodiment inspects presence or absence of abnormality on an inspection target medium, which is a printed product (hereinbelow, also referred to as a print result). In the present exemplary embodiment, image data having no abnormality and expressing a print result to be a reference is referred to as a reference image, and image data obtained by reading a print result, which is an inspection target, is referred to as a target image. Further, as preprocessing of an inspection, the image processing apparatus 100 may determine a paper white detection area (hereinbelow, also referred to as a paper white area) based on a print positional deviation amount and correct the target image using a value of the detected paper white, to match brightness of the reference image with brightness of the target image.

In the present exemplary embodiment, processing of generating a reference image suitable for an inspection by setting a print quality setting at a time of printing as an inspection condition when a print result is inspected and controlling the number of reference candidate images to be synthesized based on the set inspection condition is described.

Figure 1:
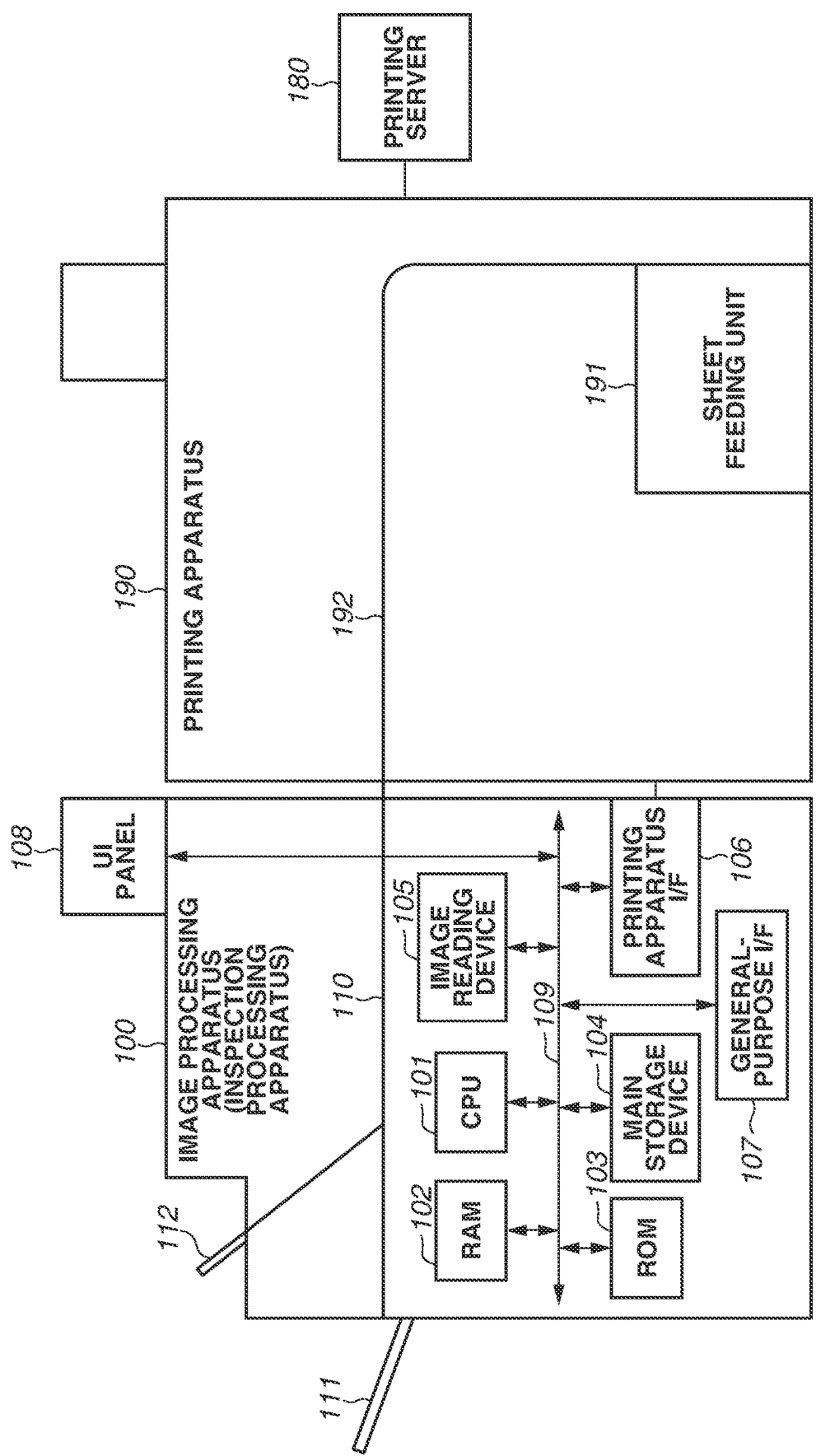
FIG. 1 is a block diagram illustrating an overall configuration of a printing system including an image processing apparatus.

FIG. 1 is a block diagram illustrating an example of an overall configuration of a printing system configured to output and inspect printed products, including the image processing apparatus 100 according to the present exemplary embodiment. The printing system according to the present exemplary embodiment includes the image processing apparatus 100, a printing server 180, and a printing apparatus 190. The printing server 180 has a function of generating a print job of a document to be printed and inputting the print job to the printing apparatus 190. The printing apparatus 190 has a function of forming an image on a recording medium (print sheet) based on the print job input from the printing server 180. As the printing apparatus 190, an apparatus employing an offset print method, an electrophotographic method, an inkjet method, or other methods can be used. In the present exemplary embodiment, the printing apparatus 190 is a printing apparatus employing the electrophotographic method. The printing apparatus 190 includes a sheet feeding unit 191, and a user sets print sheets in the sheet feeding unit 191 in advance. When a print job is input, the printing apparatus 190 forms an image on a front side or images on both sides of a sheet while conveying the print sheet set in the sheet feeding unit 191 along a conveyance path 192, and sends the sheet to the image processing apparatus 100.

The image processing apparatus 100 according to the present exemplary embodiment performs inspection processing to inspect presence or absence of abnormality on the sheet (printed product) on which the printing apparatus 190 has formed an image or images and sent through the conveyance path 192. In other words, the image processing apparatus 100 functions as an inspection processing apparatus. The image processing apparatus 100 includes a central processing unit (CPU) 101, a random-access memory (RAM) 102, a read-only memory (ROM) 103, and a main storage device 104. The image processing apparatus 100 further includes an image reading device 105, a printing apparatus interface (I/F) 106, which is an interface with the printing apparatus 190, a general-purpose I/F 107, a user I/F (UI) panel 108, and a main bus 109. The image processing apparatus 100 further includes a printed product conveyance path 110 connected with the conveyance path 192 in the printing apparatus 190, an output tray 111 for the printed products that have passed the inspection, and an output tray 112 for the printed products that have not passed the inspection because some abnormality is found. The printed products may be classified not only into two types of "passed" and "not passed" but also into more types with smaller classifications than the two types.

The CPU 101 is a processor for collectively controlling components in the image processing apparatus 100. The RAM 102 functions as a main memory and a work area for the CPU 101. The ROM 103 stores programs to be executed by the CPU 101. The main storage device 104 stores applications to be executed by the CPU 101 and data used for image processing. The image reading device 105 (scanner) reads one side or both sides of the printed product sent from the printing apparatus 190 on the conveyance path 110 to acquire the read image or read images as image data.

The printing apparatus I/F 106 is connected with the printing apparatus 190 to synchronize timings of processing of the printing apparatus 190 and processing of the printed product, and to communicate the operation states of the printing apparatus I/F 106 and those of the printing apparatus 190 with the printing apparatus 190. The general-purpose I/F 107 is a serial bus interface for a bus such as a universal serial bus (USB) and an Institute of Electrical and Electronics Engineers 1394 bus, and the user can take out data such as log data and take in some data into the image processing apparatus 100, through the general-purpose I/F 107. The UI panel 108 is, for example, a liquid crystal display, and functions as a user interface of the image processing apparatus 100 to display and inform the current status and settings to the user. Further, the UI panel 108 receives instructions from the user if the UI panel 108 includes a touch panel or buttons. The main bus 10) connects the components in the image processing apparatus 100. In addition, although not illustrated in FIG. 1, the components in the image processing apparatus 100 and the printing system can be operated by instructions issued from the CPU 101. For example, the CPU 101 can move the conveyance paths in synchronization, and select a destination to send the printed product between the output tray 111 for printed products having passed the inspection and the output tray 112 for printed products having not passed the inspection based on the inspection result. In addition to the CPU 101, a graphics processing unit may be provided.

As a whole, the image processing apparatus 100 performs inspection processing to be described below based on the image data of the printed product read by the image reading device 105 while conveying, through the conveyance path 110, the printed product sent from the printing apparatus 190. As a result of the inspection processing, in a case where the printed product has passed the inspection, the printed product is conveyed to the output tray 111 for the inspection passed printed products. Otherwise, the printed product is conveyed to the output tray 112 for the inspection not passed printed products. In this way, only the printed products with the quality confirmed can be collected in the output tray 111 as products.

Figure 2:
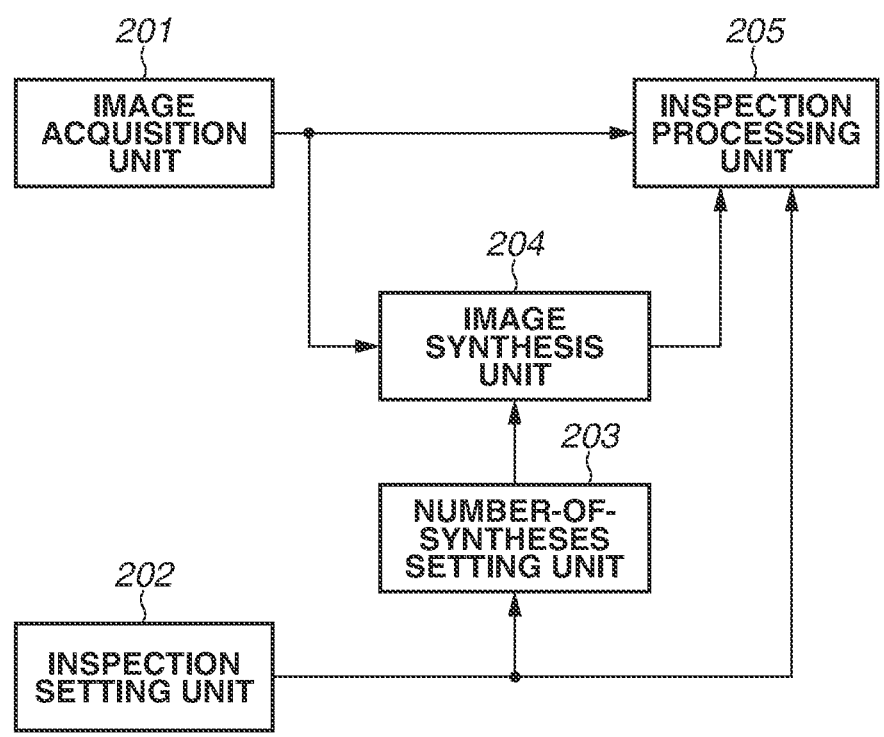
FIG. 2 is a block diagram illustrating a configuration of the image processing apparatus.

Out of the system configuration described above, FIG. 2 illustrates a configuration of function blocks related to the inspection processing of the image processing apparatus 100 according to the present exemplary embodiment. The image processing apparatus 100 includes an image acquisition unit 201, an inspection setting unit 202, a number-of-syntheses setting unit 203, an image synthesis unit 204, and an inspection processing unit 205.

The image acquisition unit 201 acquires image data of a printed product on the conveyance path 110 in synchronization with an output of the printed product from the printing apparatus 190 as reference synthesis candidate image data or inspection target image data. The acquired image data is held in the RAM 102 or the main storage device 104.

The inspection setting unit 202 makes various settings related to printing and inspection based on operations performed by the user acquired via the UI panel 108. The number-of-syntheses setting unit 203 sets the number of images to be synthesized when a reference image synthesis is performed, based on the various settings made by the inspection setting unit 202.

The image synthesis unit 204 generates reference image data by synthesizing the reference synthesis candidate image data acquired by the image acquisition unit 201. The inspection processing unit 205 performs inspection by comparing the inspection target image data acquired by the image acquisition unit 201 with the reference image data, and outputs the inspection result.

Figure 3:
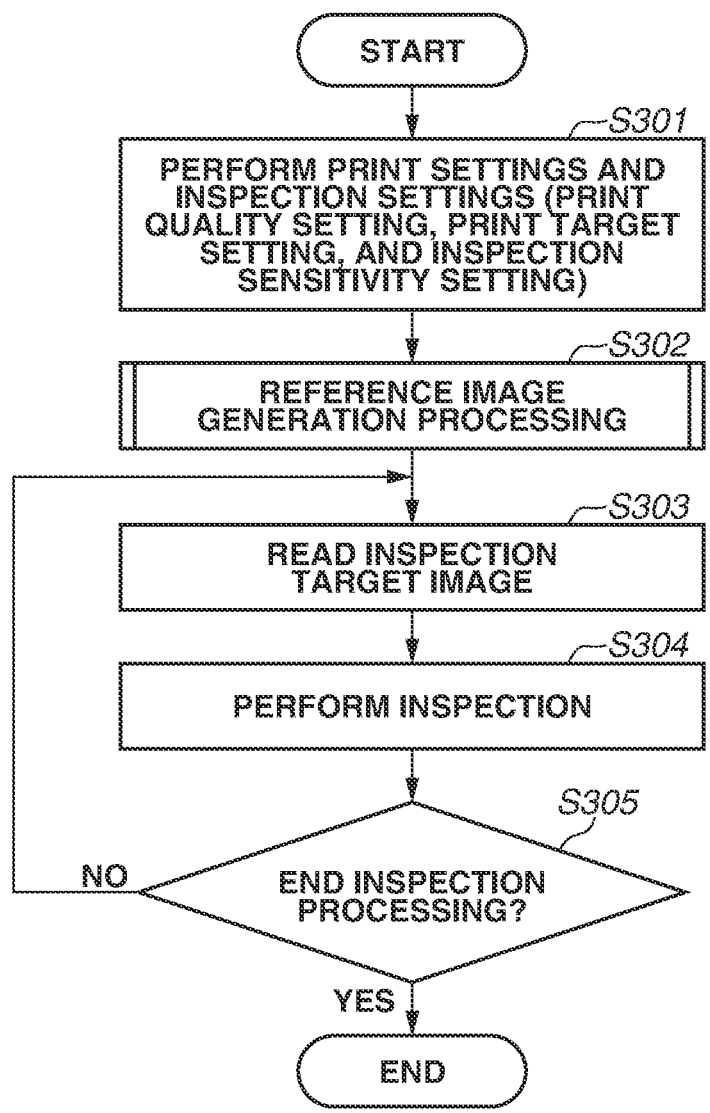
FIG. 3 is a flowchart illustrating inspection processing.

FIG. 3 is a flowchart illustrating a procedure of inspection processing performed by the image processing apparatus 100 according to the present exemplary embodiment.

Figure 5:
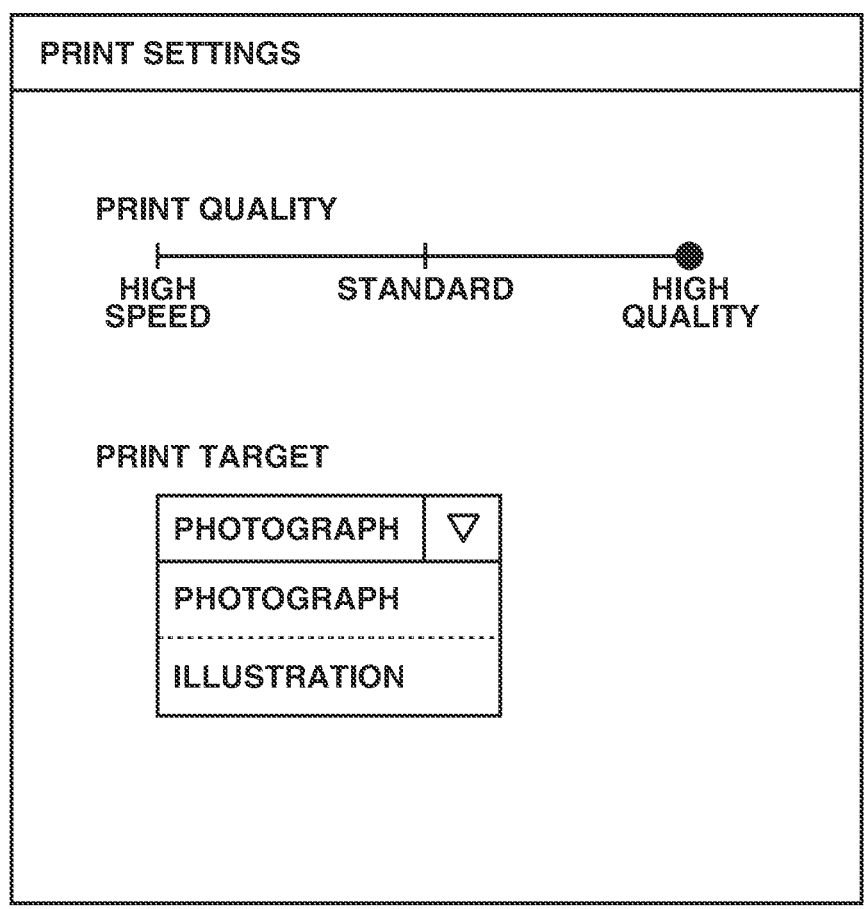
FIG. 5 is a diagram illustrating an example of a print setting screen.

In step S301, the inspection setting unit 202 makes print settings and inspection settings based on operations performed by the user acquired via the UI panel 108. Each setting value is held in the RAM 102 or the main storage device 104. In the present exemplary embodiment, assume that the inspection setting unit 202 makes a print quality setting and a print target setting as the print settings, and an inspection sensitivity setting as the inspection settings. However, the settings are not limited thereto, and other settings may be additionally performed. FIG. 5 illustrates an example of a print setting screen displayed on the UI panel 108. The user can set the print quality to any one of three stages, i.e., "high quality", "standard", and "high speed" by operating a print quality slider. In this example, the print quality becomes higher as the print quality slider moves rightward. Further, the user can set a print target from a pull-down list for the print targets.

FIG. 6 illustrates an example of an inspection setting screen displayed on the UI panel 108. On this screen, the user can set the inspection sensitivity to any one of two stages, i.e., "high sensitivity" and "low sensitivity" by operating one of radio buttons for the inspection sensitivity. A smaller print abnormality and a lower contrast print abnormality can be detected in a case where the high sensitivity is set than in a case where the low sensitivity is set.

Figure 7A:
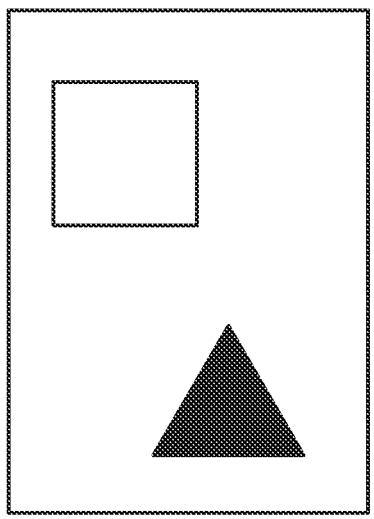
FIGS. 7A, 7B, and 7C are diagrams illustrating a reference image, an inspection target image, and a difference image, respectively.

In step S302, the image synthesis unit 204 synthesizes the reference synthesis candidate images to generate a reference image based on the inspection settings made in step S301. FIG. 7A illustrates an example of the reference image. Details of the reference image generation processing will be described below.

Figure 7B:
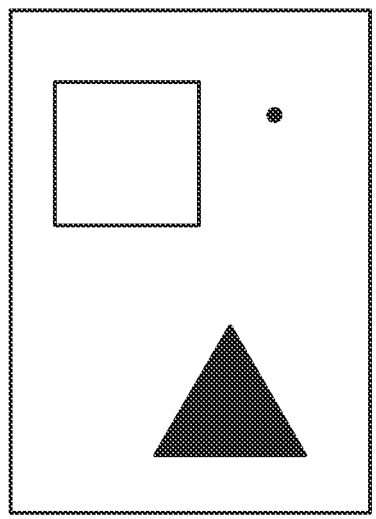

In step S303, the image acquisition unit 201 reads an inspection target image by using the image reading device 105 for scanning the printed product printed by the printing apparatus 190. The read inspection target image is held in the RAM 102 or the main storage device 104. FIG. 7B illustrates an example of the inspection target image.

Figure 7C:
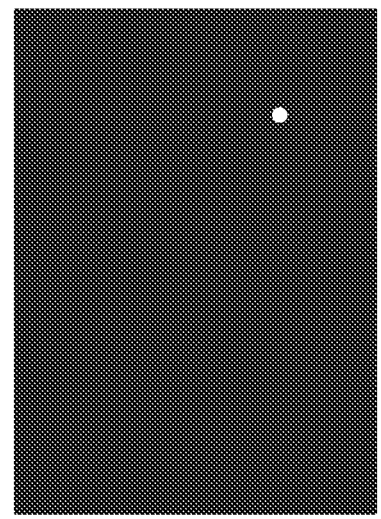

In step S304, the inspection processing unit 205 performs inspection of presence or absence of printing abnormality based on the inspection sensitivity and a difference image between the reference image and the inspection target image. Then, the inspection processing unit 205 outputs the inspection result. FIG. 7C illustrates an example of the difference image.

In step S305, the inspection processing unit 205 determines whether to end the inspection processing, based on the print information acquired from the printing apparatus 190 or a user operation acquired via the UI panel 108. In a case where the inspection processing unit 205 determines not to end the inspection processing (NO in step S305), the processing returns to step S303. In a case where the inspection processing unit 205 determines to end the inspection processing (YES in step S305), the processing ends.

<Reference Image Generation Processing>

Details of the reference image synthesis processing in step S302 will be described.

In general, the image obtained by scanning the printed product includes noises generated in printing and scanning. Thus, in the present exemplary embodiment, a reference image with a high signal-to-noise (S/N) ratio is generated by aligning a plurality of scanned images and then performing synthesis processing thereon. Since the noise amount in a scanned image changes depending on the print settings at a time of printing, the number of reference candidate images to be synthesized needs to be appropriately set based on the print settings. The setting processing of the number of reference candidate images to be synthesized will be described below.

Figure 4:
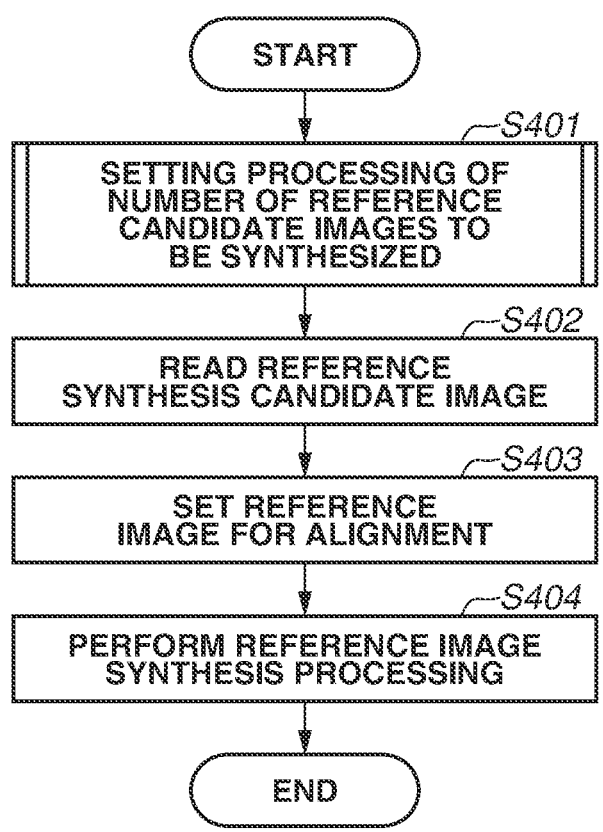
FIG. 4 is a flowchart illustrating reference image generation processing.

FIG. 4 is a flowchart illustrating a procedure of the reference image synthesis processing according to the present exemplary embodiment. Each step in the flowchart will be described.

In step S401, the image synthesis unit 204 makes setting of the number of reference candidate images to be synthesized at a time of generating a reference image by synthesizing reference candidate images. The number of reference candidate images to be synthesized is set based on the print settings and the inspection settings set in step S301. Details of the processing will be described below.

In step S402, the image acquisition unit 201 reads a printed product, as a reference synthesis candidate image, by using the image reading device 105 for scanning the printed product printed by the printing apparatus 190. The read reference synthesis candidate image is held in the RAM 102 or the main storage device 104. The reference synthesis candidate images are acquired by repeatedly performing printing and scanning until the number of acquired reference synthesis candidate images reaches the number of reference candidate images to be synthesized set in step S401.

In step S403, the image synthesis unit 204 sets a reference image to be a reference for alignment processing at a time of the reference synthesis processing. For example, the image synthesis unit 204 sets a reference synthesis candidate image acquired first as the reference image. Alternatively, a reference synthesis candidate image including no abnormality may be visually checked to be the reference image.

In step S404, the image synthesis unit 204 performs the reference image synthesis processing by calculating an average value of pixels of the reference synthesis candidate images, and generates a reference image (synthesis image). In this case, in consideration of the positional deviation at the time of scanning, the average value of the pixels of the reference synthesis candidate images may be calculated after each reference synthesis candidate image is aligned with the reference image. The alignment processing may be performed using a known alignment technique such as affine transformation. The generated reference image is held in the RAM 102 or the main storage device 104.

<Setting Processing of Number of Reference Candidate Images to be Synthesized>

Details of the setting processing of the number of reference candidate images to be synthesized will be described.

In the present exemplary embodiment, processing of setting the number of reference candidate images to be synthesized based on the print quality in the print settings set in step S301 will be described. In general, compared with a printed product having a high print quality, uneven density or the like tends to occur in a printed product having a low print quality, and thus granularity tends to deteriorate. In this case, the noise component increases to lower the S/N ratio of the printed product. For this reason, to obtain a reference image with a high S/N ratio by reducing the noise component, more images need to be averaged than those for the printed product with a high print quality.

Figure 8:
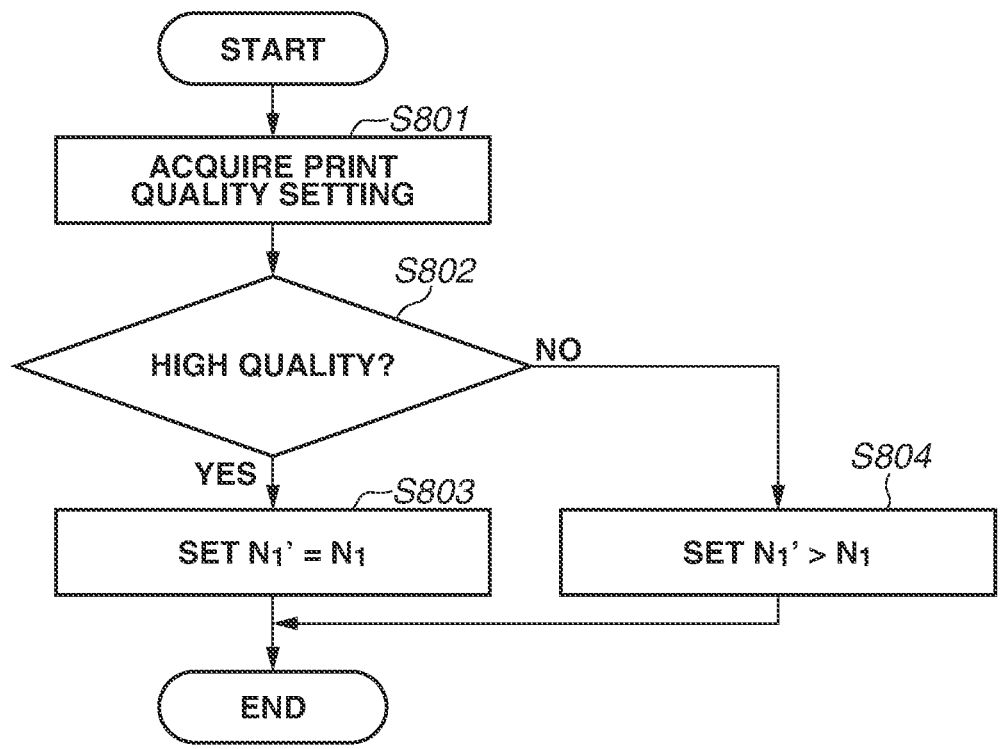
FIG. 8 is a flowchart illustrating reference setting processing according to a first exemplary embodiment.

FIG. 8 is a flowchart illustrating a procedure of setting processing of the number of reference candidate images to be synthesized performed by the number-of-syntheses setting unit 203 according to the present exemplary embodiment. Each step in the flowchart will be described.

In step S801, the number-of-syntheses setting unit 203 acquires a print quality setting stored in the RAM 102 or the main storage device 104.

In step S802, the number-of-syntheses setting unit 203 determines whether the acquired print quality is a high quality. In a case where the acquired print quality is a high quality (YES in step S802), the processing proceeds to step S803. Otherwise (NO in step S802), the processing proceeds to step S804.

In step S803, the number of reference candidate images to be synthesized $N_1'$ is set to satisfy $N_1'=N_1$. $N_1$ is the number of reference candidate images to be synthesized determined so that the S/N ratio of the reference image has an enough value for inspection at a time of synthesizing the reference synthesis candidate images obtained from the printed product printed with a high quality.

In step S804, the number of reference candidate images to be synthesized $N_1'$ is set to satisfy $N_1'>N_1$. The printed product printed with a print quality determined not to be a high quality tends to have a lower S/N ratio than the printed product printed with a high quality setting. For this reason, more reference synthesis candidate images need to be averaged so that the S/N ratio of the reference image has an enough value for inspection. Thus, the number of reference candidate images to be synthesized $N_1'$ needs to be set larger than the default value $N_1$, which is set based on the high quality printing.

Through the processing described above, the number of reference candidate images to be synthesized for generating a reference image suitable for inspection can be set based on the print quality setting in the print settings.

According to a second exemplary embodiment, processing to control the number of reference candidate images to be synthesized based on a print target setting in the print settings is described as an inspection condition.

Procedures of the inspection processing and the reference image generation processing performed by the image processing apparatus 100 in the present exemplary embodiment are similar to those performed in the first exemplary embodiment, and the descriptions thereof are omitted. In the present exemplary embodiment, setting processing of the number of reference candidate images to be synthesized is different from that in the first exemplary embodiment. In the first exemplary embodiment, the processing based on the print quality setting is described. In the present exemplary embodiment, the setting processing of the number of reference candidate images to be synthesized based on the print target setting in the print settings is described.

Figure 9:
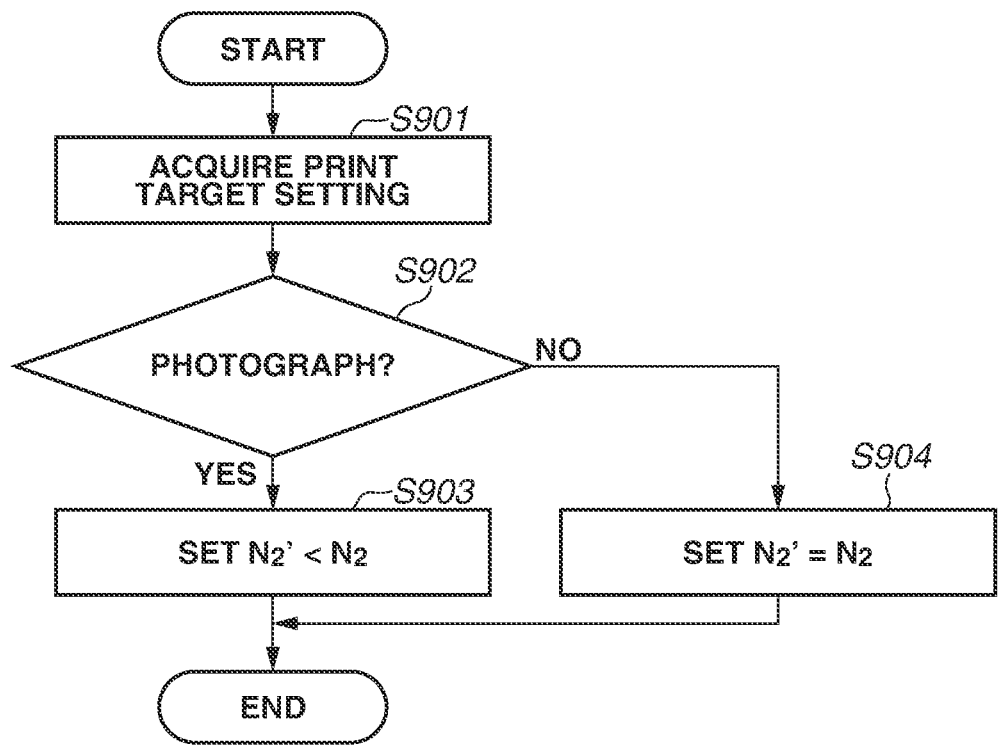
FIG. 9 is a flowchart illustrating reference setting processing according to a second exemplary embodiment.

FIG. 9 is a flowchart illustrating a procedure of the setting processing of the number of reference candidate images to be synthesized performed by the number-of-syntheses setting unit 203 according to the present exemplary embodiment. Each step in the flowchart will be described.

In step S901, the number-of-syntheses setting unit 203 acquires a print target setting stored in the RAM 102 or the main storage device 104.

In step S902, the number-of-syntheses setting unit 203 determines whether the acquired print target setting is a photograph. In a case where the acquired print target setting is a photograph (YES in step S902), the processing proceeds to step S903. Otherwise (NO in step S902), the processing proceeds to step S904.

In step S903, the number of reference candidate images to be synthesized $N_2'$ is set to satisfy $N_2'<N_2$. The printed product printed with the print target setting being a photograph tends to include more edge portions than the printed product printed with the print target setting being an illustration. In the reference image synthesis processing, when a plurality of images is averaged, edges become unsharp due to a small positional deviation of the images. With this unsharpness, the abnormality detection accuracy may decrease in a case where print abnormalities are present around the edges of the images. To reduce the influence, the following processing is performed when the reference synthesis candidate images obtained from the printed products printed with the print target setting being an illustration are synthesized. Specifically, the number of reference candidate images to be synthesized $N_2'$ is set to be smaller than the number of reference candidate images to be synthesized $N_2$, which is determined so that the S/N ratio of the reference image has an enough value for inspection. More specifically, the number of reference candidate images to be synthesized for a photograph including relatively more edges is smaller than that for an illustration including relatively fewer edges.

In step S904, the number of reference candidate images to be synthesized $N_2'$ is set to satisfy $N_2'=N_2$.

Through the series of processing described above, the number of reference candidate images to be synthesized for generating a reference image suitable for inspection can be set based on the print target setting in the print settings.

In the present exemplary embodiment, the example case where the print target setting is a photograph or an illustration is described. However, the print target setting is not limited thereto. For example, for a setting for, for example, a document including many edges, unsharpness of edges generated at a time of the reference synthesis can be reduced to obtain a similar effect to the present exemplary embodiment by setting the number of reference candidate images to be synthesized $N_2'$ to satisfy $N_2'<N_2$.

According to a third exemplary embodiment, processing to control the number of reference candidate images to be synthesized based on, as an inspection condition, an inspection sensitivity setting in the print settings is described.

Procedures of the inspection processing and the reference image generation processing performed by the image processing apparatus 100 in the present exemplary embodiment are similar to those performed in the first exemplary embodiment, and the descriptions thereof are omitted. In the present exemplary embodiment, setting processing of the number of reference candidate images to be synthesized is different from that in the first exemplary embodiment. In the first exemplary embodiment, the processing based on the print quality setting in the print settings is described. In the present exemplary embodiment, setting processing of the number of reference candidate images to be synthesized based on the inspection sensitivity setting in the inspection settings is descried.

Figure 10:
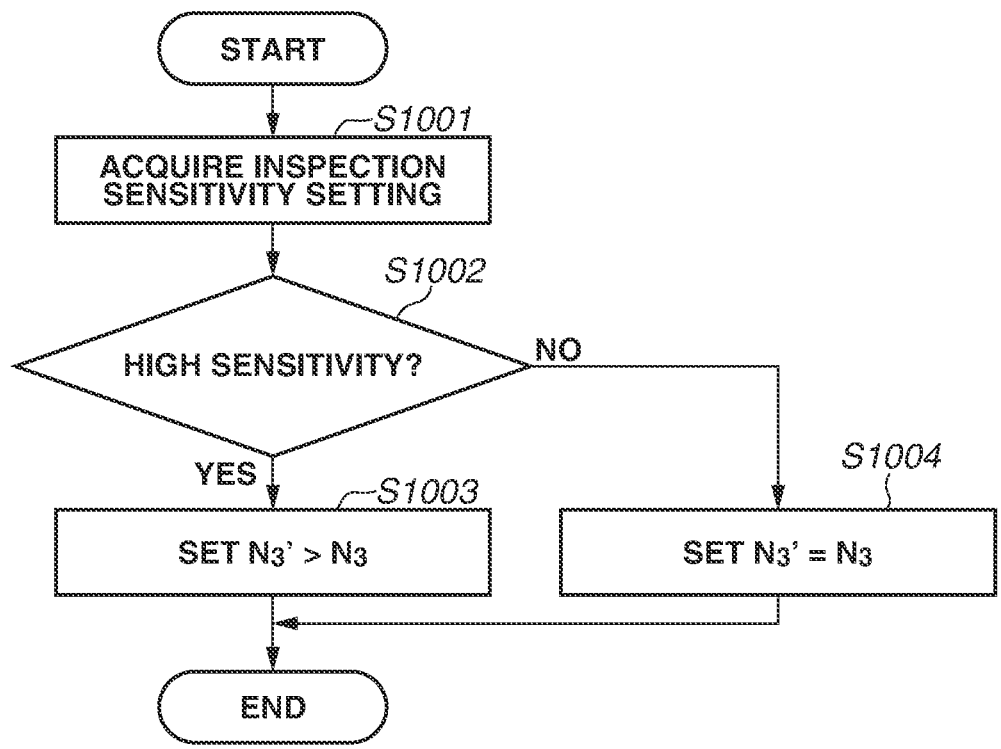
FIG. 10 is a flowchart illustrating reference setting processing according to a third exemplary embodiment.

FIG. 10 is a flowchart illustrating a procedure of setting processing of the number of reference candidate images to be synthesized performed by the number-of-syntheses setting unit 203 according to the present exemplary embodiment. Each step in the flowchart will be described.

In step S1001, the number-of-syntheses setting unit 203 acquires an inspection sensitivity setting stored in the RAM 102 or the main storage device 104.

In step S1002, the number-of-syntheses setting unit 203 determines whether the acquired inspection sensitivity setting is a high sensitivity. In a case where the acquired inspection sensitivity setting is a high sensitivity (YES in step S1002), the processing proceeds to step S1003. Otherwise (NO in step S1002), the processing proceeds to step S1004.

In step S1003, the number of reference candidate images to be synthesized $N_3'$ is set to satisfy $N_3'>N_3$.

More specifically, in the case where the inspection sensitivity setting is a high sensitivity setting, the user desires to detect a smaller print abnormality or a lower contrast print abnormality. In a case where an S/N ratio of a scanned image is low due to noise generated at a time of scanning, it is difficult to distinguish between the noise component in the scanned image and the small print abnormality or the low contrast print abnormality. Accordingly, it is difficult to detect the print abnormality. For this reason, a reference image with a high S/N ratio needs to be prepared. Thus, a reference image with a higher S/N ratio is generated by setting the number of reference candidate images to be synthesized $N_1'$ to be larger than the number of reference candidate images to be synthesized $N_3$, which is determined so that the print abnormality can be appropriately detected in a case where the inspection sensitivity setting is set to a low sensitivity setting.

In step S1004, the number of reference candidate images to be synthesized $N_3'$ is set to satisfy $N_3'=N_3$.

Through the series of processing described above, the number of reference candidate images to be synthesized for generating a reference image suitable for inspection can be set based on the inspection sensitivity setting in the inspection settings.

In a fourth exemplary embodiment, setting processing of the number of reference candidate images to be synthesized in a case where an inspection sensitivity setting in the inspection settings has changed from an inspection preset value prepared in advance will be described.

A procedure of inspection processing according to the present exemplary embodiment performed by the image processing apparatus 100 is the same as that described in the first exemplary embodiment, except for the processing performed in step S301. In the present exemplary embodiment, in the inspection setting processing performed in step S301, the inspection setting unit 202 performs an inspection preset setting, in addition to the print settings and the inspection settings, based on user operations acquired via the UI panel 108. Each setting value is held in the RAM 102 or the main storage device 104. FIG. 12A illustrates an example of an inspection preset selection screen. A user sets an inspection preset value by operating a radio button to select one of a preset A, a preset B, and a preset C. In the present exemplary embodiment, the following description is given assuming that the user has selected the preset B. FIG. 12B is a table illustrating an example of contents of the preset values. In this table, the inspection sensitivity setting and the number of reference candidate images to be synthesized are held as a group, in association with each preset value. These groups are generated by setting in advance the number of reference candidate images to be synthesized suitable for each inspection sensitivity setting.

A procedure of the reference image generation processing is the same as that in the first exemplary embodiment, and the description thereof is omitted.

Figure 11:
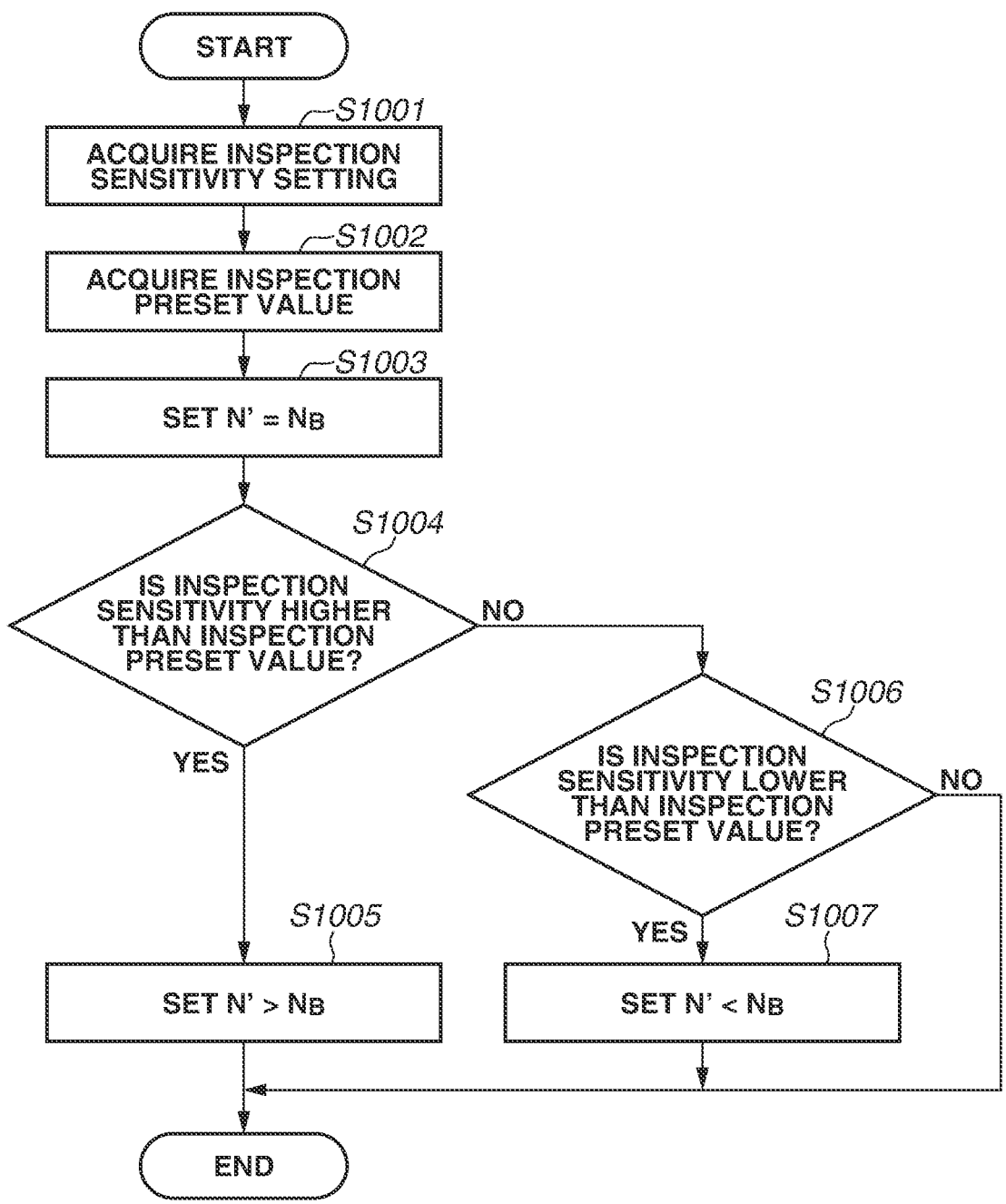
FIG. 11 is a flowchart illustrating reference setting processing according to a fourth exemplary embodiment.

Setting processing of the number of reference candidate images to be synthesized according to the present exemplary embodiment will be described. FIG. 11 is a flowchart illustrating a procedure of setting processing of the number of reference candidate images to be synthesized performed by the number-of-syntheses setting unit 203 according to the present exemplary embodiment. Each step in the flowchart will be described.

In step S1101, the number-of-syntheses setting unit 203 acquires an inspection sensitivity setting stored in the RAM 102 or the main storage device 104.

In step S1102, the number-of-syntheses setting unit 203 acquires an inspection preset value stored in the RAM 102 or the main storage device 104. For example, in a case where the user has selected the preset B in step S301, the preset B is acquired as the inspection preset value. As illustrated in FIG. 12B, the preset B is a setting including the middle sensitivity as the inspection sensitivity setting and $N_B$ as the number of reference candidate images to be synthesized.

In step S1103, the number-of-syntheses setting unit 203 sets the number of reference candidate images to be synthesized N' to the preset value acquired in step S1102. For example, in a case where the preset B is acquired as the inspection preset, the number of reference candidate images to be synthesized N' is set to satisfy $N'=N_B$ in the present exemplary embodiment.

In step S1104, the number-of-syntheses setting unit 203 compares the inspection sensitivity setting acquired in step S1101 and the inspection sensitivity setting in the inspection preset acquired in step S1102. In a case where the inspection sensitivity setting acquired in step S1101 is higher than the inspection sensitivity setting in the inspection preset (YES in step S1104), the processing proceeds to step S1105. Otherwise (NO in step S1104), the processing proceeds to step S1106.

In step S1105, the number-of-syntheses setting unit 203 sets the number of reference candidate images to be synthesized N' to a value larger than the number of reference candidate images to be synthesized in the inspection preset acquired in step S1103. For example, in a case where the preset B is acquired as the inspection preset, the number of reference candidate images to be synthesized N' is set to satisfy $N'>N_B$ in the present exemplary embodiment.

In step S1106, the number-of-syntheses setting unit 203 compares the inspection sensitivity setting acquired in step S1101 and the inspection sensitivity setting in the inspection preset acquired in step S1102. In a case where the inspection sensitivity setting acquired in step S1101 is lower than the inspection sensitivity setting in the inspection preset (YES in step S1106), the processing proceeds to step S107. Otherwise (NO in step S1106), the processing ends.

In step S1107, the number-of-syntheses setting unit 203 sets the number of reference candidate images to be synthesized N' to a value smaller than the number of reference candidate images to be synthesized in the inspection preset acquired in step S1103. For example, in a case where the preset B is acquired as the inspection preset, the number of reference candidate images to be synthesized N' is set to satisfy $N'<N_B$ in the present exemplary embodiment.

Through the series of processing described above, the number of reference candidate images to be synthesized for generating a reference image suitable for inspection can be set, in a case where the inspection sensitivity setting in the inspection settings has changed from the preset value prepared in advance.

In the present exemplary embodiment, the example, in which the inspection sensitivity setting and the number of reference candidate images to be synthesized are associated with each preset value, is described. However, the content of each preset is not limited thereto. For example, in a table illustrated in FIG. 13, the print quality setting, the print target setting, the inspection sensitivity setting, and the number of reference candidate images to be synthesized are associated with each preset value. These groups are generated by setting in advance the number of reference candidate images to be synthesized suitable for a case where printing and inspection are performed based on each setting.

In the present exemplary embodiment, the number-of-syntheses setting unit 203 compares the inspection sensitivity setting set in step S301 and the inspection sensitivity setting selected as the preset value, and controls the number of reference candidate images to be synthesized. However, in the example illustrated in FIG. 13, for example, the number-of-syntheses setting unit 203 may control the number of reference candidate images to be synthesized by comparing the print quality setting set in step S301 and the print quality setting selected as the preset value. Using a combination of the print quality setting, the print target setting, and the inspection sensitivity setting, the number-of-syntheses setting unit 203 may control the number of reference candidate images to be synthesized. For example, in a case where a user selects the preset B and then sets the print quality setting to a high quality, the print target setting to an illustration, and the inspection sensitivity setting to a high sensitivity, the number of reference candidate images to be synthesized N' satisfies $N'=N_B$ based on the print quality setting, $N'=N_B$ based on the print target setting, and $N'>N_B$ based on the inspection sensitivity setting. In this case, the number of reference candidate images to be synthesized N' may be set, in a comprehensive manner, to satisfy $N'>N_B$. Even in a case where increase and decrease in the number of reference candidate images to be synthesized contradict each other between the setting values, it is possible to solve such a case by setting order of priority in advance for the setting items of the print quality setting, the print target setting, and the inspection sensitivity setting.

Other Modification Examples

In the exemplary embodiments described above, the example of setting the number of reference candidate images to be synthesized to generate a reference image is described. However, without synthesizing the reference candidate images, a target image and each of the set numbers of reference images may be compared, and presence or absence of abnormality in a synthesis image generated by synthesizing (e.g., averaging) the comparison results may be determined.

Embodiments of the present disclosure can also be implemented by supplying a program for realizing one or more functions of the exemplary embodiments described above to a system or an apparatus via a network or a storage medium, and one or more processors in the system or the apparatus reading and executing the program. Embodiments of the present disclosure can also be implemented by a circuit (e.g., Application Specific Integrated Circuits (ASIC)) realizing one or more functions.

According to the exemplary embodiments described above, occurrence of excessive detection and erroneous detection can be restrained by controlling the number of reference images to be synthesized based on inspection conditions in inspection of the printed products.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-063948, filed Apr. 5, 2021, which is hereby incorporated by reference herein in its entirety.

What is claimed is:

1. An image processing apparatus configured to determine presence or absence of print abnormality in a target image by comparing a reference image or reference images, each of which is a print result to be a reference, and the target image, which is a print result to be an inspection target, the image processing apparatus comprising:
one or more processors that are configured to:
set an inspection sensitivity for a printed product; and
compare the reference image or reference images and the target image using a number of the reference images set based on the inspection sensitivity,
wherein the one or more processors compare the reference image or reference images and the target image using the reference image or reference images determined so that the number of reference images is increased as the set inspection sensitivity is higher.

2. The image processing apparatus according to claim 1, wherein the one or more processors acquire a preset value, which is a set of the inspection sensitivity and a number of reference images, compares the inspection sensitivity set in advance and the preset value, and sets the number of reference images based on a comparison result.

3. The image processing apparatus according to claim 2, wherein, in a case where the inspection sensitivity set in advance is higher than the inspection sensitivity in the preset value as a result of the comparison, the one or more processors compare the reference image or reference images and the target image using the reference image or reference images determined so that the number of reference images corresponding to the inspection sensitivity set in advance is more than the number of reference images in the preset value.

4. The image processing apparatus according to claim 2, wherein, in a case where the inspection sensitivity set in advance is lower than the inspection sensitivity in the preset value as a result of the comparison, the one or more processors compare the reference image or reference images and the target image using the reference image or reference images determined so that the number of reference images corresponding to the inspection sensitivity set in advance is less than the number of reference images in the preset value.

5. The image processing apparatus according to claim 1, wherein the one or more processors generate a synthesis image by synthesizing the set number of reference images, and output the presence or absence of abnormality in the target image based on a difference between the synthesis image and the target image.

6. A non-transitory computer-readable storage medium storing a program including instructions, which when executed by one or more processors of an image processing apparatus configured to determine presence or absence of print abnormality in a target image by comparing a reference image or reference images, each of which is a print result to be a reference, and the target image, which is a print result to be an inspection target, cause the image processing apparatus to:

set an inspection sensitivity for a printed product; and compare the reference image or reference images and the target image using a number of the reference images set based on the inspection sensitivity, wherein the reference image or reference images and the target image are compared using the reference image or reference images determined so that the number of reference images is increased as the set inspection sensitivity is higher.

7. An image processing method for determining presence or absence of print abnormality in a target image by comparing a reference image or reference images, each of which is a print result to be a reference, and a target image, which is a print result to be an inspection target, the image processing method comprising:

setting an inspection sensitivity for a printed product; and comparing the reference image or reference images and the target image using a number of the reference images set based on the inspection sensitivity, wherein the reference image or reference images and the target image are compared using the reference image or reference images determined so that the number of reference images is increased as the set inspection sensitivity is higher.

8. An image processing apparatus configured to determine presence or absence of print abnormality in a target image by comparing a reference image or reference images, each of which is a print result to be a reference, and the target image, which is a print result to be an inspection target, the image processing apparatus comprising:

one or more processors that are configured to:

set a print quality for a printed product; and compare the reference image or reference images and the target image using a number of the reference images set based on the print quality, wherein the one or more processors compare the reference image or reference images and the target image using, in a case where the set print quality is not a high quality, the reference image or reference images determined so that the number of reference images is more than that in a case where the set print quality is a high quality.

\* \* \* \* \*